US012127581B2

(12) United States Patent
Iodice et al.

(10) Patent No.: US 12,127,581 B2
(45) Date of Patent: Oct. 29, 2024

(54) METHOD AND SYSTEM FOR PRODUCING OF RECONSTITUTED VEGETABLE FILMS

(71) Applicant: IOTO INTERNATIONAL INDÚSTRIA E COMÉRCIO DE PRODUTOS AROMÁTICOS LTDA, Parana (BR)

(72) Inventors: Bianca Iodice, Greenville, NC (US); Marcel Astolphe, Curitiba (BR); Mateus Barbian Urio, Curitiba (BR)

(73) Assignee: IOTO INTERNATIONAL INDÚSTRIA E COMÉRCIO DE PRODUTOS AROMÁTICOS LTD, Parana (BR)

( * ) Notice: Subject to any disclaimer, the term of this patent is extended or adjusted under 35 U.S.C. 154(b) by 1007 days.

(21) Appl. No.: 16/970,251

(22) PCT Filed: Feb. 16, 2018

(86) PCT No.: PCT/BR2018/050035
§ 371 (c)(1),
(2) Date: Dec. 14, 2020

(87) PCT Pub. No.: WO2019/157576
PCT Pub. Date: Aug. 22, 2019

(65) Prior Publication Data
US 2021/0244069 A1    Aug. 12, 2021

(51) Int. Cl.
*A24B 3/14*    (2006.01)
*A24B 15/14*    (2006.01)
(Continued)

(52) U.S. Cl.
CPC ............... *A24B 3/14* (2013.01); *A24B 15/14* (2013.01); *A24B 15/16* (2013.01); *A24B 15/286* (2013.01);
(Continued)

(58) Field of Classification Search
CPC ................................. A24B 3/14; A24B 15/16
See application file for complete search history.

(56) References Cited

U.S. PATENT DOCUMENTS 4,226,148 A * 10/1980 Logan ............... A01H 4/003
                                                    131/33
8,580,081 B2 * 11/2013 Dumas .............. A24D 1/025
                                                    977/734
(Continued)

FOREIGN PATENT DOCUMENTS

BR        9301513 A        10/1993
WO    2016067226 A1        5/2016

OTHER PUBLICATIONS

International Search Report from International Application No. PCT/BR2018/050035, dated May 23, 2018, 2 pages.
(Continued)

*Primary Examiner* — Russell E Sparks
(74) *Attorney, Agent, or Firm* — Ward and Smith, P.A.; Ryan K. Simmons

(57) ABSTRACT

A method and system for producing reconstituted vegetable strips. The method may include milling of vegetable materials to particle sizes between 10 to 200 MESH; mixture of cellulose fibers in an intensive mixer to 1 to 10 min; mixture of vegetable material to a binding compound added to the nanocellulose fibers; adding humectant agent and water to the mixture; submitting the mixture to a shearing step through a pre-lamination system including two linear and parallel lamination rollers; submitting a strip to a mixture in an intensive mixer for obtainment of an homogeneous mass; lamination of the mixture between two linear and parallel lamination rollers, obtaining a continuous strip with a specific thickness; drying the vegetable strip through its passage through a thermal chamber in a specific temperature,
(Continued)

between 90° C. and 900° C.; cutting and final processing of the dry strip to obtain the final product.

13 Claims, 10 Drawing Sheets

(51) Int. Cl.
*A24B 15/16* (2020.01)
*A24B 15/28* (2006.01)
*A24B 15/30* (2006.01)
*B32B 23/10* (2006.01)
*B32B 37/00* (2006.01)
*B82Y 30/00* (2011.01)
*B82Y 40/00* (2011.01)

(52) U.S. Cl.
CPC ............ *A24B 15/303* (2013.01); *B32B 23/10* (2013.01); *B32B 37/0053* (2013.01); *B82Y 30/00* (2013.01); *B82Y 40/00* (2013.01)

(56) References Cited

U.S. PATENT DOCUMENTS

| | | | |
|---|---|---|---|
| 9,943,101 B2 | 4/2018 | Torrens et al. | |
| 2005/0098187 A1* | 5/2005 | Grierson | A24B 3/14 131/290 |
| 2008/0199574 A1* | 8/2008 | Iodice | A24B 15/14 241/38 |
| 2014/0305455 A1* | 10/2014 | Crooks | A24D 3/061 131/332 |
| 2015/0007839 A1 | 1/2015 | Torrens et al. | |

OTHER PUBLICATIONS

Written Opinion from International Application No. PCT/BR2018/050035, dated May 23, 2018, 7 pages.

* cited by examiner

METHOD AND SYSTEM FOR PRODUCING OF RECONSTITUTED VEGETABLE FILMS

RELATED APPLICATIONS

The present application is a 35 U.S.C. § 371 national phase application of PCT International Application No. PCT/BR2018/050035, having an international filing date of Feb. 16, 2018. The above PCT International Application was published as International Publication No. WO 2019/157576 A1.

TECHNICAL FIELD

The technical field of the present invention belongs to the fields of mechanical engineering, chemistry and its correlates, more specifically to a method and system for obtaining vegetable strips of different natures, comprising from reconstituting vegetable materials to producing vegetable laminate, through various processing steps, in order to provide processability characteristics to a mixture of vegetable derivatives and additives, and to the final product.

BACKGROUND OF THE INVENTION

Methodologies for reconstituting vegetable materials are known in prior art.

The U.S. Pat. No. 720,830A is an example of processes of reconstituting tobacco.

In this document, it is described the extraction of a fibrous portion of vegetable residues for producing sheets similar to paper ones, in which extracts and additives are subsequently added in order to provide organoleptic characteristics to paper similar to tobacco ones.

Prior art patent documents also relate the concern of replacing cigarette wrapping, as it is the case of U.S. Pat. No. 2,944,553A.

The U.S. Pat. No. 3,831,609A, which is the continuation of the works described by U.S. Pat. No. 3,834,398A, also describes new methods for obtaining different wrappers.

In these three documents, it is described the use of materials of cellulose origin, and they suggest the usage of materials of synthetic origin.

It is proposed the usage of homopolymers such as polyethylene or polystyrene, as well as, copolymers such as poly(styrene-co-butadiene), polycarbonates, with ketone and hydroxyl groups, among others.

It is highlighted on the prior art, the process described in patent document US2008199574, which aligns financial matters deriving from the reutilization of residues for generating value and decrease of generating liabilities, environmental, technological, inventive aspects and of security.

In this document, it is proposed a laminating system attached to the drying of the laminate, thus decreasing the expenses with equipment and consequently with the installation area and movable parts, and also, decreasing the quantity of water added and consequently decreasing the quantity of energy required to dry the final strip.

The prior art patent documents describe the use of materials of cellulose origin and suggest the usage of materials of synthetic origin.

However, such synthetic materials confer undesirable characteristics to the final product, for example, an accelerated burning rate, premature "flaking" process, primary and secondary streams with unpleasant odors and irritating characteristics to the product.

Furthermore, synthetic materials are normally insoluble in water, making the use of solvents required, and requiring the use of hard metal as catalysts, aside from critical processing conditions.

Considering all the sector's regulation, the usage of any of these materials presents itself as an unfeasible alternative.

Simultaneously to technological advances, there are advancements in health and information accessibility areas, that, aligned with media, have been characterizing tobacco-based products in a very negative way to new customers.

New sanctions and regulations have also been proposed, decreed and even imposed frequently.

Before this restrictive framework that seeks to discourage the consumption of tobacco-based products, a new need to consume products that are not tobacco-based arises, even to consumers of tobacco-based products, for crafting their own cigarettes, cigarillos and derivatives, from a differentiated product.

Considerable efforts have been applied for developing substitute materials for tobacco. For the most part, this development is divided in two fronts.

In one of these aspects, varied vegetable derivatives are treated such as direct substitutes for tobacco leaves, being dried, cured and cut accordingly for the different applications.

The other line of development, on the other hand, is based on reconstituting vegetables derivatives for producing reconstituted vegetable strips.

Comparatively, the second alternative to tobacco products is more compelling, since the standardization of the final product becomes possible.

The disadvantage of this process, however, is that the existing processes require using large quantities of binding agents.

As for binding agents, we have the following examples: methyl cellulose, alginate, guar gum, tragacanth gum, xanthan gum, arabic gum, among others.

The need for large quantities of these agents originates from their form of processing.

In general, the powdered vegetable material and the binding agents (cohesion) are added to a liquid phase and are then homogenized to form a mud-like mixture.

This "mud" is then spilled over a heated surface for the evaporation of the liquid phase and obtainment of the desired vegetable laminate.

To meet the demand for non-tobacco products and also the so-called "wrappers" or wrappings for the manufacture of products by the consumers, the process similar to "formation of mud" previously reported does not meet the demand for physical and mechanical characteristics required for such purposes.

From the viewpoint of the sector of reconstituted vegetables, the sector of reconstituted tobacco stands out as consolidated.

The development of the sector and the flexibility of the techniques, which result in products with a reasonable mechanical resistance, is mostly due to the presence and utilization of the stem residue of the tobacco, extensively known by its high quantity of fiber.

The crucial nature of this dependence can be evidenced primarily in the process said to be similar to paper production.

Aiming to meet the existing market demand, there is the need for development of a process that can produce vegetable strips of high mechanical performance and that are also flexible enough so that different vegetable bases can be used.

In terms of process flexibility, comparatively there is a need for both laminates, also known as strips, of tobacco, and other products, such as cocoa, licorice, green mate tea, roasted mate tea, coffee, green tea, chamomile, sage, among others.

Seeing that there is an enormous constitutional difference between these vegetable raw materials, the biggest difficulty becomes how to cover all of the advantages of commonly specific processes for a vegetable subtype such as tobacco, to the required demands for process flexibility ahead of the market's demands.

It is, therefore, required adding fibers in individual intermediate steps of the process.

It is also required to obtain components for the individual intermediate steps of the process.

In attention to the flexibility of the process, it is required to use of cellulose-based products in a nanometric scale, more specifically, given its action as a reinforcing agent due to its high aspect ratio (diameter/length), low density and elevated elastic modulus that it is capable of achieve.

The typical processes of obtaining nanocellulose, however, are considered insufficient due to their low scale of production, few pilot state initiatives, as well as energetic cost and technical viability of production.

Therefore, it is possible to determine production in large scale of nanocellulose as a second challenge to solving the difficulty of aligning advantages and technical flexibility of processing usually consolidated for tobacco to new vegetable materials.

Typical processes of obtaining nanocellulose may be classified as "top-down" processes or "bottom-up" processes, referring to the origin basis of the nanocellulose.

The typical "top-down" processes include mechanical methods with the possibility of chemical or enzymatic pretreatment, and processes of acid hydrolysis in an aqueous medium are also used.

The following are substrates for the "top-down" processes, wood, cotton, sugar cane, beet, hemp, linen, among others.

"Bottom-up" processes correspond to the bacterial biosynthesis in an agitated or static medium.

In a large scale of production, the production difficulties become visible.

These processes, on the other hand, use bacterias such as from the type *Gluconacetobacter*, whose substrates are sugar and alcohol of low molecular weight.

Lamination steps later to the intensive mixture steps provide both a better dispersion and drafting of fibers and processability conditions, such that, specific dimensional control is possible.

Using as basis the patent document US2008199574 for the individual lamination step, it is suggested modifications on the claims from the final processing of the lamination.

The document US2008199574, suggests the passage of particulate vegetables through a lamination system whose rollers have dimensions of 1.000 mm of diameter and 1.100 mm of length.

Although visually one has the perception of uniformity in the outer diameter of these rollers, along its length, there is a mechanical flexure.

Due to the physical effort of which the rollers cited in document US2008199574 are subjected to, there is a perpendicular deformation to the body axis, therefore, such setting is not applicable to producing vegetal laminates when it is desired constant uniformity along its width.

SUMMARY OF THE INVENTION

The present applicant has developed, over the years, sufficient technology for the design of an unusual process in which it becomes possible to align the advantages previously presented by the process described in document US2008199574 to the needs of technological development.

Such success in development is further evidenced by the process of obtaining the nanocellulose modifying agent, but is not limited to it.

The present invention aims to present a process comprised by steps of obtaining and incorporating vegetable material of varied origins in different grain sizes; obtaining and/or incorporating reinforcing agents such as fibers of natural origin; of homogenizing additives in particulate vegetables and incorporating reinforcing agents; submitting the homogenized to mechanical stress and shearing tensions; producing reconstituted vegetable strips of high mechanical resistance and precision thickness; and drying of powder aggregates and particulate vegetables.

As a technological proposal, it aims to obtain materials of distinct physical properties.

For such, it is proposed the use of nanocellulose, seeing that its application has been getting prominence and notoriety for presenting properties and behaviors superior to conventional fibers, in addition to being frequently associated with sustainability.

The present invention proposes the use of cellulose-based materials in a nanometric scale, more specifically, given its action as a reinforcing agent due to its high aspect ratio (diameter/length), low density and elevated elastic modulus that it is capable to achieve.

The present invention refers to the process for reconstituting powder of vegetable origin, through the creation of strips of high mechanical resistance, whose primary destination is the smoking industries, more specifically as a wrapper for cigarettes, cigarillos, cigars and derivatives or even for using it to manufacture cigarettes without tobacco or as load for mixture with tobacco.

These strips can also be used for manufacturing films for skin application, in processes of removal or in dermatological processes for skin treatment, in addition to other applications that they might offer.

The solution found, and that consists of one of the steps of the process which is the subject matter of this patent, is the processing of cellulose fibers originally presented in a nanometric scale through an intensive mixer as a form of new "top-down" process.

The present invention has numerous advantageous effects on sustainable, cost-effectiveness and technological development aspects.

One of the main advantageous effects provided by the technology of the present invention is the obtainment of materials of high mechanical resistance (required in different applications) and that, at the same time, it provides flexibility of operation according to the desirable features on the final product.

The present invention also enables producing reconstituted vegetable strips with high precision thickness.

The application of the step of drying powder aggregates and vegetable particulates associated with the other steps of obtaining materials of high mechanical resistance of the present invention, requires low costs for its industrial feasibility, aggregating demands of reliability, mechanical resistance and maintenance of organoleptic characteristics from the processed vegetable, in a cost-effective matter.

The processing of cellulose fibers in a nanometric scale through the present invention, makes it possible to obtain cellulose fibers in a viable scale and/or its uniformly dispersion in the vegetable mass, enabling the production of high performance vegetable laminates.

The FIGS. 5A, 5B, 5C, 5D, 5E, and 5F illustrate the strain/deformation profiles obtained according to the physical properties of reconstituted vegetable strips of mate herb obtained from different processing configurations.

DETAILED DESCRIPTION

Figure 1:
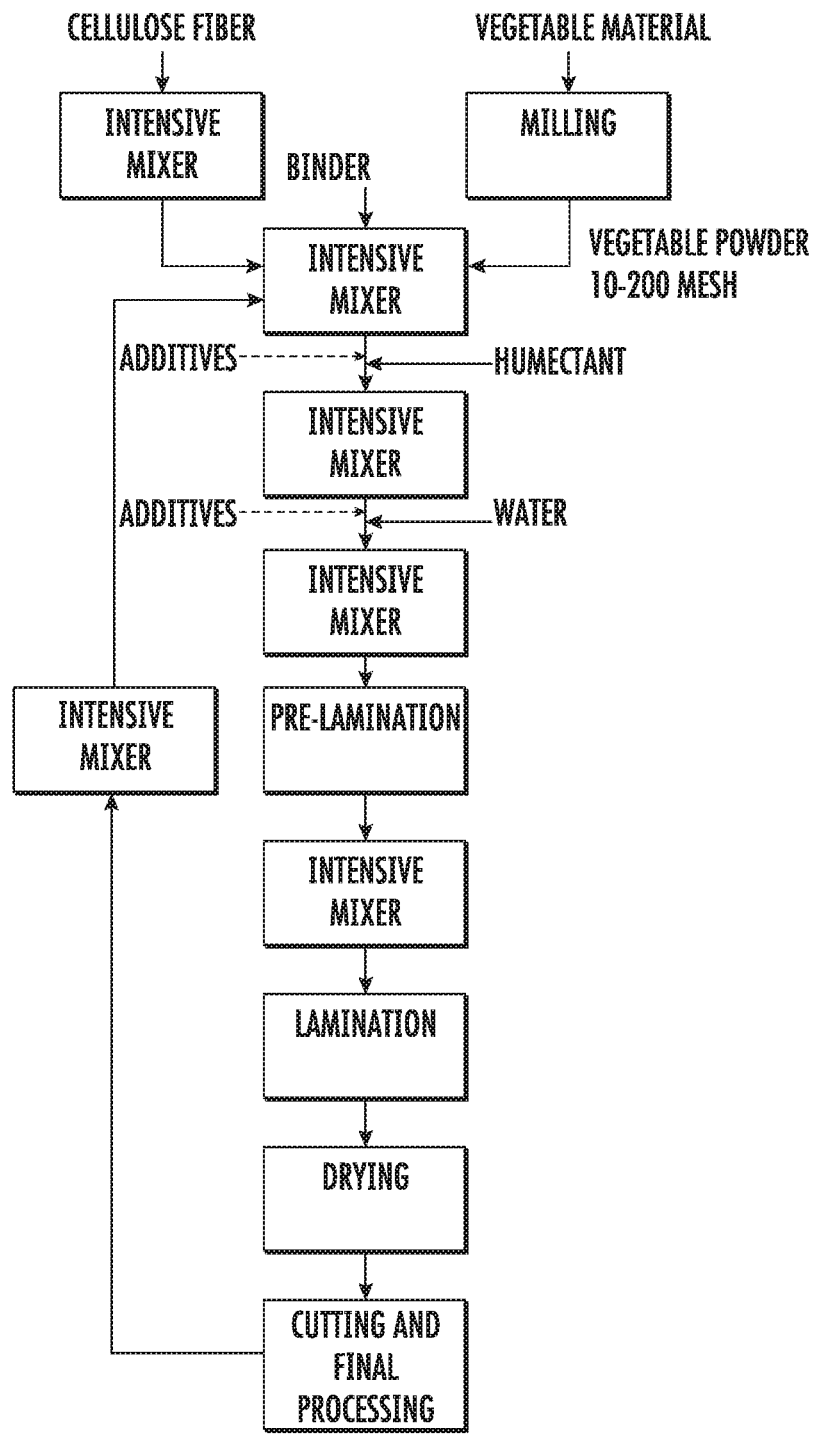
FIG. 1 is a block diagram with the main operational steps involved in the present invention.

In order to facilitate the comprehension of the process described in this patent, FIG. 1 is a block diagram with the main operational steps involved in the process of producing reconstituted vegetable strips of the present invention, comprising the steps of:
- (a) milling vegetable materials to reach specific particle sizes between 10 and 200 MESH;
- (b) mixturing cellulose fibers in an intensive mixer for 1 to 10 min;
- (c) mixturing the vegetable material obtained from step (a) with an agglutinating compound added to the nanocellulose fibers obtained from step (b);
- (d) adding humectant agents and water to the mixture described in step (c);
- (e) submitting the mixture described in step (d) to a step of shearing through a prelamination system comprised by at least two linear and parallel rollers;
- (f) submitting the strip obtained from step (e) to a mixture in an intensive mixer to obtain a homogeneous mass;
- (g) laminating the mixture obtained from step (f) between at least two linear and parallel lamination rollers, obtaining a continuous strip of specific thickness;
- (h) drying the vegetable strip obtained from step (g) through its passage through a thermal chamber in a specific temperature, between 90° C. and 900° C., through a conveyor belt; and
- (i) cutting and final processing of the dried strip obtained from step (h) for obtaining the final product.

In order to execute the different steps of the process of the present invention, the invention also features a system for producing reconstituted vegetable strips, comprising:
- (i) a milling equipment of vegetable materials, such as hammer mills or other similar equipment, that performs the milling of such vegetable materials so that the particles reach specific sized between 10 and 200 MESH;
- (ii) an intensive mixer that performs the mixture of cellulose fibers in between 1 to 10 min, and that performs the mixture of vegetable material obtained through the milling equipment with an agglutinating compound added to the nanocellulose fibers obtained from said mixture in the said intensive mixer;
- (iii) a pre-lamination equipment that, through at least two linear and parallel rollers, performs the shearing of the mixture obtained through the intensive mixer, comprised by the vegetable material, agglutinating compound and nanocellulose fibers, together with adding at least one humectant agent and water;
- (iv) an intensive mixer that executes the submission of the strip obtained from the pre-lamination equipment for obtaining a homogeneous mass;
- (v) a lamination equipment that executes lamination of the mixture obtained from the intensive mixer between at least two linear and parallel lamination rollers, obtaining a continuous strip of specific thickness;

a drying equipment of the vegetable strip obtained from the lamination equipment through the passage of said vegetable strip through a thermal chamber in a specific temperature, between 90° C. to 900° C., through a conveyor belt; and
- (vi) a cutting and final processing equipment of the dried strip obtained from the drying equipment of the vegetable blade, for obtaining the final product.

In reference to the process of the present invention, the step of milling the vegetable material may be performed on at least one vegetable material from the tobacco leaves group type, cured or not, from different types, such as Oriental, Burley or Virginia, or from the tobacco residue group type such as stem, scraps, winnovers or winnowings, tobacco residues in general and tobacco strips of any type or class, and the like.

The milling step of the vegetable material may be performed on at least one vegetable material such as yerba mate, sage, chamomile, cocoa, acai, lemon grass, guarana, orange, banana, coffee, cinnamon and clove.

The milling step of the vegetable material may be performed in a milling equipment, or other equipment similar to comminution, such as a roller crusher, ball mills, jaw crusher, gyratory crusher, impact crusher, conical crusher or hammer mills.

The milling step of the vegetable material uses vegetable materials according to the size of the particle in which he is inserted.

Initially, a fibrous material, whose mass corresponds to 1 to 50% of the total dry mass of the formulation, is submitted to a process of opening the fiber in order to decrease its length to a nanometric scale or close to it, in addition to improving its dispersion, eliminating the agglomeration, in an intensive mixture during 1 to 10 min.

The step of mixturing cellulose fibers in intensive mixers may use at least one cellulose fiber, such as a short fiber cellulose, long fiber cellulose, cellulose nanofibers, or other similar cellulose.

It is added to the fibrous material an agglutinating agent, whose mass corresponds to 1 to 30% of the total dry mass of the formulation, and a vegetable material, whose mass corresponds from 30 to 80% of the total dry mass of the formulation, previously milled and picked in size ranges of the particles that can vary from 10 to 200 MESH.

This mixture is homogenized from 1 to 10 minutes.

The step of adding an agglutinating compound to the nanocellulose fibers, obtained from intensive mixers, can be performed by using at least one binder such as corn starch, wheat starch, potato starch, oat starch, rice starch; non-starch hyrdrocolloids, acacia gum, arabic gum, xantham gum, guar gum, tara gum, locust beans (LBG), pectins, gelatins, agar-agar, alginates, carrageenan, carboxymethyl cellulose (CMC), hydroxypropyl cellulose (HPC) or microcrystalline cellulose (MCC), among other binding agents.

It is then added a humectant agent, corresponding to 1 to 20% of the total dry mass from the formulation, and the homogenization is maintained for 1 to 10 min.

Lastly, the water is added in a quantity that corresponds to 30 to 60% of the final mass' content, and the homogenization is maintained for 1 to 10 min.

During the addition of the humectant agent and/or water, additives can also be added, such as colorant, extracts, flavorings, flavor substances, among others.

The step of adding a humectant agent may be performed through using at least one humectant agent such as glycerine, propylene glycol, among other humectant agents.

The intensive mixer of high shearing capacity utilized in a few steps of the present invention, may be an intensive mixer such as the ones used by various food industries, for example, in the production of sauces, mayonnaises, yogurts, or in the processing of solid materials, for example, such as the cutter mixer GUM-240E sold by GEIGER® (https://www.geiger.ind.br/cutter-mixer-gum/).

In the present invention, this equipment is used for the opening of cellulose fibers, and during the various steps of mixturing the mass to be laminated.

The standard operation procedure of an intensive mixer comprises of various technical characteristics for executing its functionalities, for example, a control panel for automatic activation, or manual operation of the mixer, stop functions, start or restart of the mixer, closing and opening functions of the cap, on/off functions of different speed levels, control over the water discharge, as well as other alarm functions and indication of the conditions operations.

The intensive mixer equipment exemplified in the present invention in a non-restrictive manner also comprises a tilting part, as well as the agitator and the bottom scraper.

The mass obtained after the steps of adding the humectant agent and water are, then, submitted to a pre-lamination process.

In this operation, the material undergoes a compression in a lamination equipment, comprised of two metallic rollers, for example in stainless steel, linear and parallel with variable and adjustable spacing from 0.02 to 2.50 mm, of independent speed, and that differ from one another in gaps of 0.01 to 30 rpm.

This process, which may be executed, sequentially, more than once, causes a stretching, decreasing the thickness and homogenization of the distribution on the mass and cellulose fibers, promoting the obtainment of more resistant materials.

The shearing step through a pre-lamination equipment occurs, for example, through an equipment comprised by two rollers, for example with diameter of 500 mm, which are conducted by reducer motors (through a cardan shaft), wherein the rollers comprise 600 mm of functional length.

The pre-lamination equipment is an assembly comprised by two lamination rollers conducted by reducer motors.

The equipment is equipped with an individual speed and approximation controller of the rollers.

The equipment is similar to the final lamination assembly, already described by patent document US2008199574 under ownership of the same applicant of the present invention, however, said equipment is not accompanied by a furnace.

The material may be submitted to sequential steps of pre-lamination, and in the end of this process, it is once again homogenized in the intensive mixer, so thereafter, it can be conducted to the final lamination.

Figure 2:
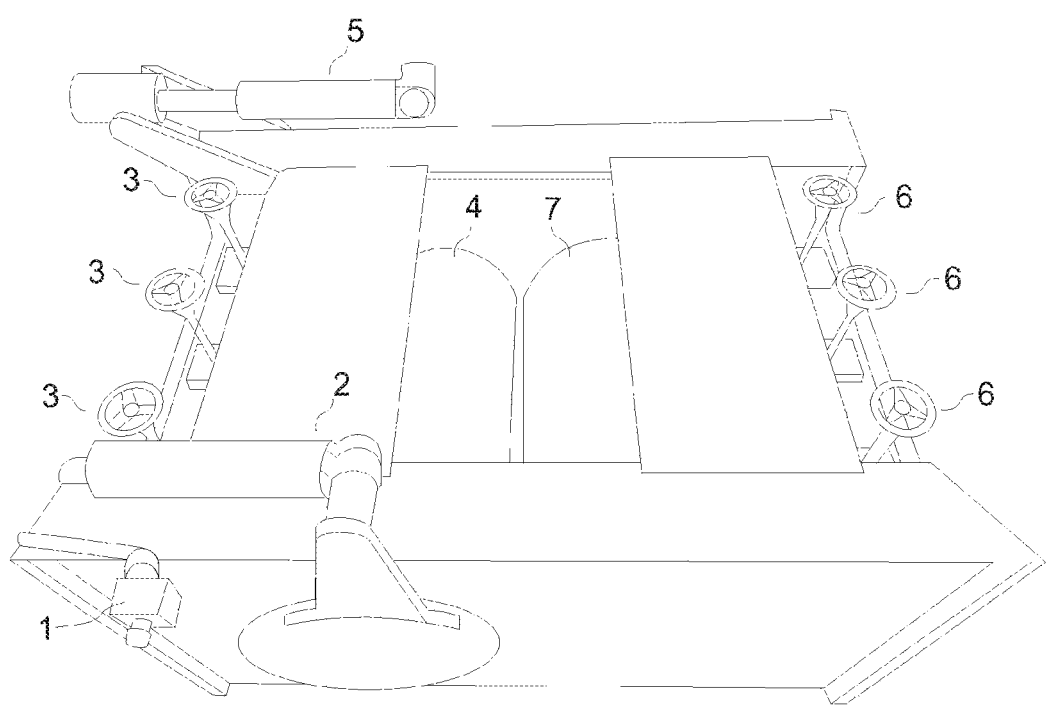
FIG. 2 is a configuration applied to an equipment for execution of the pre-lamination step according to the present invention.

FIG. 2 is a configuration applied in an equipment for the execution of the pre-lamination step according to the present invention, in which some of its operational components for the execution of its functionalities may be observed, such as emergency actuators (01), a mechanical left arm (02), scraping knives regulators (03) of a first roller (04), mechanical right arm (05), scraping knives regulators (06) of a second roller (07).

The standard operational procedure of a pre-laminator is comprised by various other functionalities through other elements, for example, a control panel comprised by an emergency actuation, mechanical arm adjustment switches, mechanical arm actuation screens, mechanical arm controllers, and roller speed controllers.

The shearing step performed through a lamination system may be performed multiple times to ensure the mechanical resistance of the final product.

After the pre-lamination, the humid strip obtained is again comminuted in an intensive mixer for 1 to 10 min in order to facilitate its processing during the final lamination.

The final lamination consists of passing the mass through a set of cylindrical metal rollers parallel to each other, for example, with variable and adjustable distance between 0.04 and 2.50 mm, of independent speed and with variation of 0.01 to 15 rpm between each other. The thickness of the material is defined according to the control of the distance between the rollers.

Once the strip is formed, for example of thickness between 0.04 to 2.50 mm, it is conducted via a conveyor belt through a drying furnace of variable temperature, generally being adjusted between 90° C. to 900° C., more specifically it can be adjusted between 90° C. and 450° C.

The humidity of the final product, which may vary from 1.0 to 40%, is controlled from the set point of the furnace temperature and the speed of the conveyor.

For this purpose, the present invention further comprises a lamination equipment having at least two lamination rollers, for example with diameter of 500 mm, which are conducted by reduction motors, the rollers comprising 500 mm of useful length.

The equipment presented in the form of a lamination assembly, are equipped with individual speed and proximity control system between them.

When passing between the rollers, the mass, comprised by the vegetable material, fiber, binder, humectant and water, is transformed into a thin blade on the surface of the roller and is continuously removed by a knife coupled in tangential angulation to the roller.

This blade is then placed on a conveyor and travels in the interior of the furnace until it reaches an approximate humidity between 8 to 12% (m/m).

The equipment is similar to the final lamination assembly already described in US2008199574, which is owned by the same applicant of the present invention, however the size of the rollers has been reduced in order to maintain a standard thickness throughout the width of the strip.

Figure 3:
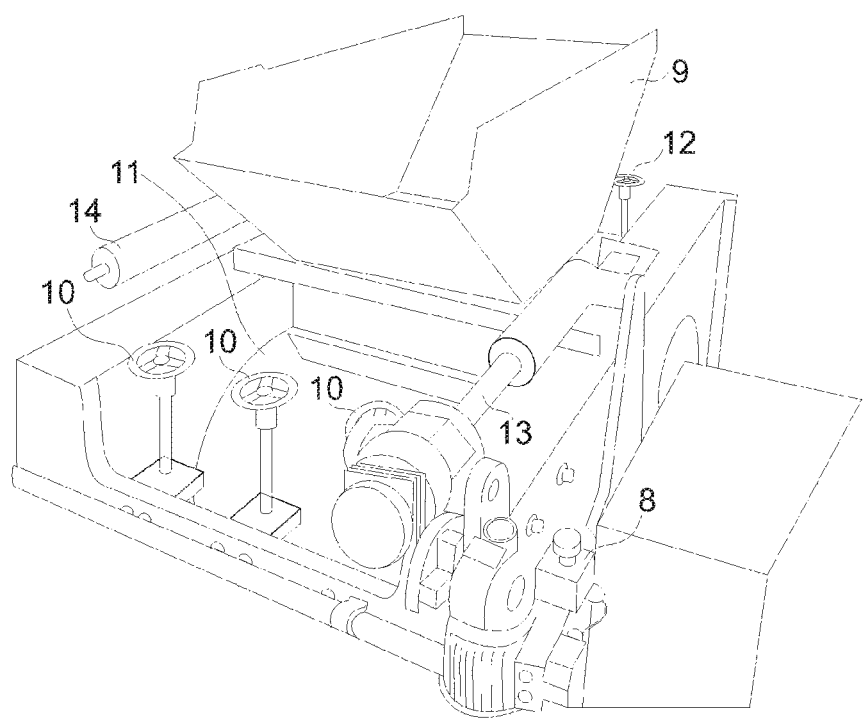
FIG. 3 is a configuration applied to an equipment for execution of the lamination step according to the present invention.

FIG. 3 is a configuration applied in an equipment for implementation of the lamination step in according with the present invention, wherein some of its main components can be observed, such as emergency driver (08), the chamber of addition of material (09) scraping knives regulators (10) of a first roller (11) scraping knives regulators (12) of a second roller, left mechanical arm (13) and right mechanical arm (14).

The standard operation procedure of a laminator exemplified by this invention in a non-restrictive manner, comprises several elements to ensure the operation of its features, for example, control panel comprising of at least one controller for at least one drying chamber, at least one blower controller, at least one blower for at least one drying zone, at least one resistance switch, at least one resistance starting switch, insufflator failure alert identifier, at least one emergency actuator, roller speed controllers, exhaust controller, conveyor speed controller, mechanical arms, and mechanical arms actuation screens.

When leaving the furnace, the strip is subjected to final processing, which may include cutting steps for further winding, or other layouts of these materials in different formats that meet different industrial and/or commercial applications that might show, for example, coils of different lengths and diameters, cut filler, cut rag, rectangular cuts, square cuts, among others.

Figure 4:
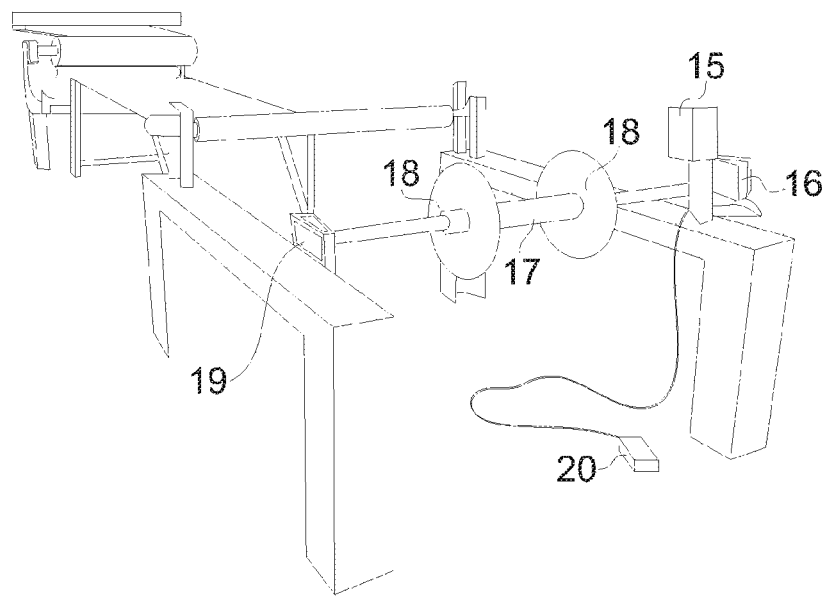
FIG. 4 is a bobbin winder used in the present invention.
Figure 5A:
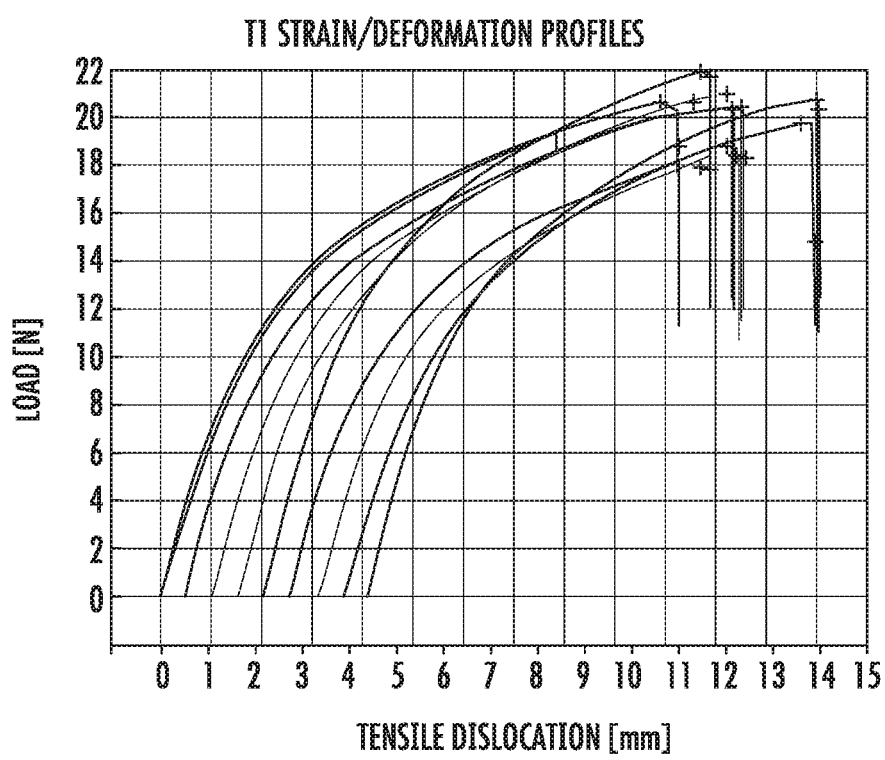
Figure 5B:
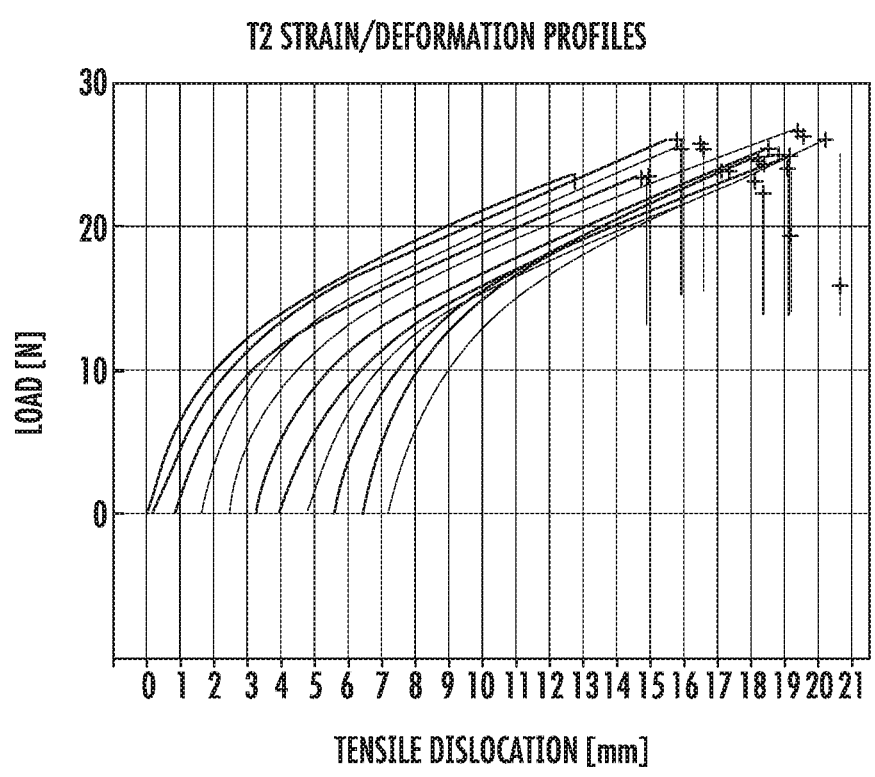
Figure 5C:
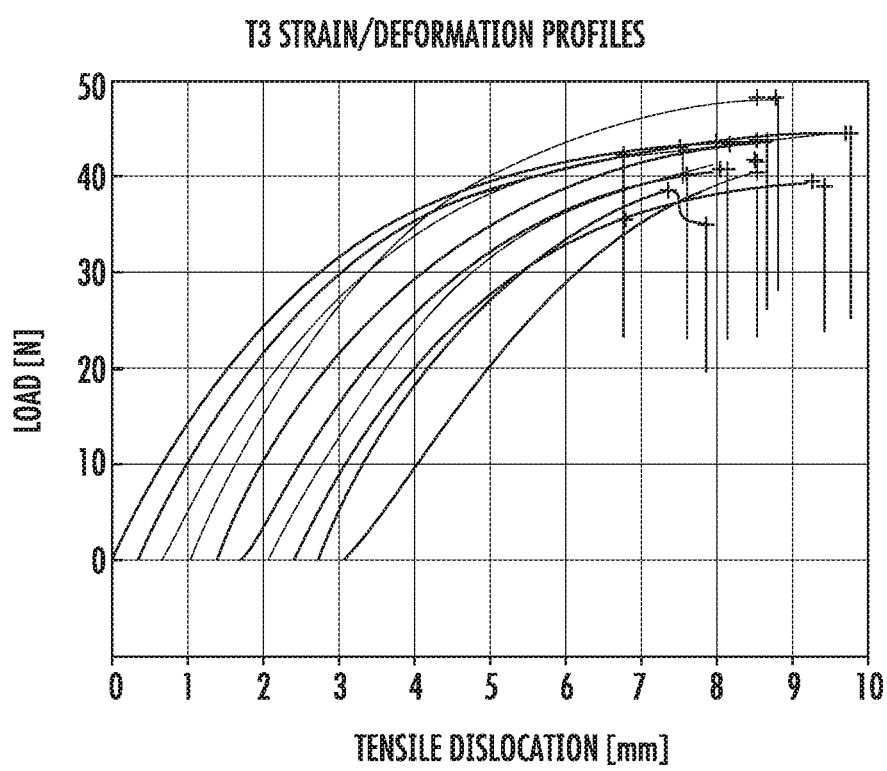
Figure 5D:
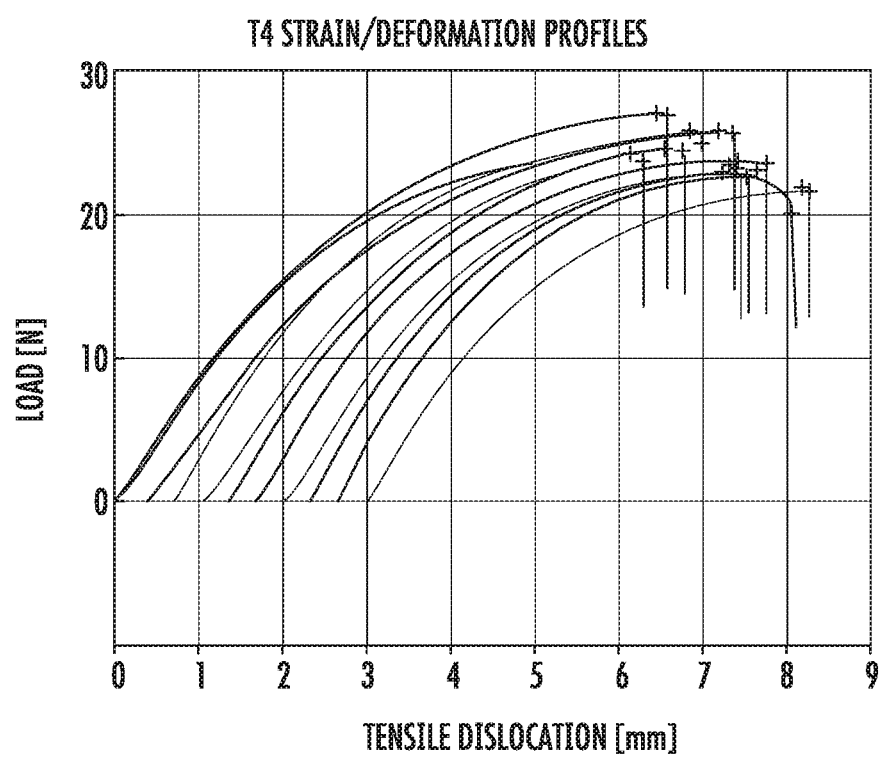
Figure 5E:
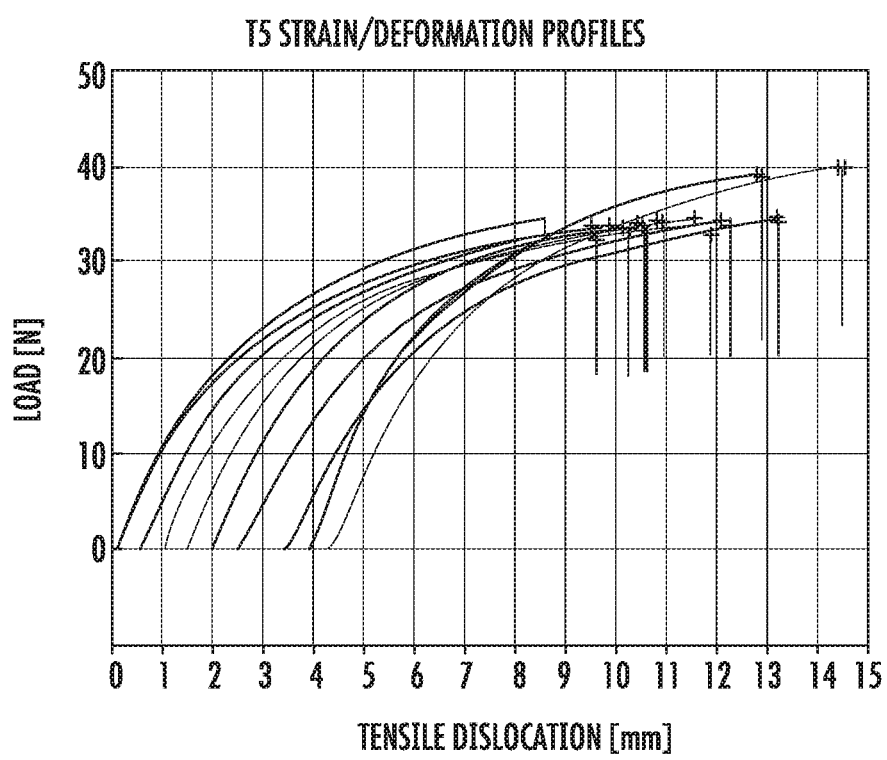
Figure 5F:
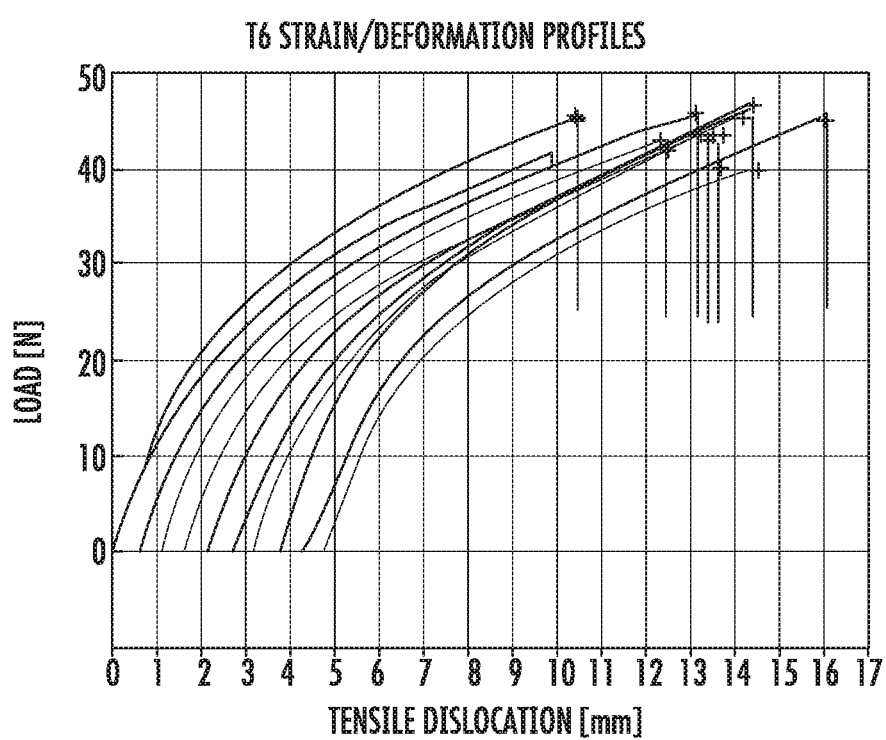

As seen in FIG. 4, in order to obtain the coils of different lengths and diameters, the present invention uses, in an exemplary and non-restrictive manner, winding equipment that comprise speed controllers parts (15) of the winding machine, clockwise/counterclockwise rotational direction actuation switch (16), coil shaft (17), coil retainer (18), coil shaft lock (19), coil actuator pedal (20), among others.

The scraps from the cutting and final processing, can again be incorporated into the process, replacing proportionally the input raw material, in order to increase the overall cost-effective and environmental yield.

For such, the scraps must be subjected to homogenization in an intensive mixer for 1 to 10 min, and incorporated to the process together with adding a binding agent and vegetable material powder.

The final product can be used as wrapping material or as loads for smoking products, such as cigarettes, cigarillos, among others, in addition to other applications.

The process herein described allows for the use of both highly fibrous base materials, for example, the smoking stem, as well as base materials that exhibit low levels of fibers, for example, cocoa powder.

In this way, the best processing conditions are distinct and should take into account the different features of the raw materials but also desirable physical aspects of the final product.

To better illustrate this effect, different physical properties of reconstituted vegetable strips of yerba mate obtained from different processing configurations are presented in Table 1, which details the physical properties of reconstituted vegetable strips of yerba mate obtained from different processing configurations, being accompanied by their respective strain/deformation profiles.

Example 1

Initially, the processing of 3.00 kg of short fiber pulp in an intensive mixer, for example the type GEIGER GUM-240E, is carried out during 3 min.

It is added to the mixer vessel:
11.35 kg of crushed *Salvia* leaves (passing through a 66 mesh sieve), 1.20 kg of carboxymethylcellulose, and the mixture is carried out for 3 further minutes.

To facilitate the dispersion, with the intensive mixer in operation, a solution of 1.50 kg of propylene glycol, 0.35 kg of ethanol and 0.0225 kg of *Salvia* oil is added, and the process is maintained for 2 further min, when then 11.0 kg of water is added and agitation is maintained for a further 3 minutes.

The material is laminated twice, and then returns to the intensive mixer, where it is again processed for 3 further minutes.

Finally, the material is submitted to the final lamination with on-line monitoring for obtaining a strip with a thickness of 0.10 mm and moisture after drying of 11%, but not limited to these standards.

Example 2

Initially, the processing of 2.00 kg of short fiber pulp in an intensive mixer, for example the type GEIGER GUM-240E, is carried out during 3 min.

It is added to the intensive mixer:
9.00 kg of film scraps of yerba mate, already mixed, separately, in intensive mixer for 3 min, 10.00 kg of milled yerba mate (passing through a 66-mesh sieve), 0.80 kg of carboxymethylcellulose, and the mixture is performed for 3 further minutes.

To facilitate the dispersion, with the intensive mixer in operation, 1.00 kg of propylene glycol is added, and the process is maintained for 2 further min, when then 9.0 kg of water is added and agitation is maintained for a further 3 minutes.

TABLE 1

| Fiber Mix | Pre-lamination | Test | Thickness (mm) | Mixture Content (%) | Weight (g/m$^2$) | Maximum Stress (cN) | Tensile Strength (kgf/mm$^2$) |
|---|---|---|---|---|---|---|---|
| Mixed Fibers | Not executed | T1 | 0.11 ± 0.00 | 13.93 ± 0.37 | 135.30 ± 7.08 | 2,022.41 ± 118.72 | 0.75 ± 0.04 |
| | Once | T2 | 0.10 ± 0.00 | 13.04 ± 0.23 | 154.30 ± 6.01 | 2,503.62 ± 11.58 | 1.02 ± 0.05 |
| | Twice | T3 | 0.11 ± 0.01 | 10.92 ± 0.06 | 161.60 ± 8.84 | 4,247.84 ± 281.32 | 1.54 ± 0.11 |
| Unmixed Fibers | Not executed | T4 | 0.12 ± 0.01 | 11.73 ± 0.31 | 150.70 ± 8.92 | 2,434.43 ± 159.47 | 0.81 ± 0.07 |
| | Once | T5 | 0.11 ± 0.00 | 11.84 ± 0.19 | 178.10 ± 8.34 | 3,538.63 ± 228.18 | 1.31 ± 0.09 |
| | Twice | T6 | 0.10 ± 0.01 | 12.28 ± 0.40 | 208.09 ± 5.87 | 4,428.50 ± 188.49 | 1.51 ± 0.06 |

It is observed in the presented data, and as seen in FIGS. 5A to 5F, the gain of mechanical resistance and the increase of weight to the extent that performs the step of fiber mixture and sequential kneading steps are executed.

In this way, the technology developed in the present invention provides the obtaining of materials of high mechanical resistance (required in different applications).

Below are some example embodiments of different products obtained, without departing from the essential scope of the present invention.

The material is kneaded once and returns to the intensive mixer for 3 further minutes.

Finally, the material is submitted to the final lamination with on-line monitoring for obtaining a strip with thickness of 0.15 mm and moisture after drying of 10%, but not limited to these standards.

Example 3

Initially, the processing of 3.50 kg of short fiber pulp in an intensive mixer, for example the type GEIGER GUM-240E, is carried out during 3 min.

It is added to the intensive mixer:

7.50 kg of cocoa powder (passing through a 60-mesh sieve), 2.50 kg of cassava flour acigal, 1.00 kg of carboxymethylcellulose, 1.55 kg of guar gum and the mixture is performed for 3 further minutes.

To facilitate the dispersion, with the intensive mixer in operation, a solution of 1.50 kg of propylene glycol and 0.225 kg of vanillin are added, and the process is maintained for 2 further min, when then 10.0 kg of water is added, and agitation is maintained for a further 3 minutes.

The material is kneaded twice and returns to the intensive mixer for 3 further minutes.

Finally, the material is submitted to the final lamination with on-line monitoring for obtaining a strip with thickness of 0.11 mm and moisture after drying of 11%, but not limited to these standards.

Example 4

Initially, the processing of 3.00 kg of short fiber pulp in an intensive mixer, for example the type GEIGER GUM-240E, is carried out during 4 min.

It is added to the intensive mixer:

13.50 kg of tobacco residue of Burley type (ground and passante in 40 mesh sieve), 1.10 kg of carboxymethylcellulose, and the mixture is performed for 3 further minutes.

To facilitate the dispersion, with the intensive mixer in operation, a solution of 1.35 kg of propylene glycol is added, and the process is maintained for 3 further minutes, when then 10.0 kg of water is added, and the agitation is maintained for 4 further minutes.

The material is kneaded twice and returns to the intensive mixer for 3 further minutes.

Finally, the material is submitted to the final lamination with on-line monitoring for obtaining a strip with thickness of 0.12 mm and moisture after drying of 12%, but not limited to these standards.

Initially, the processing of 3.50 kg of short fiber pulp in an intensive mixer, for example the type GEIGER GUM-240E, is carried out during 3 min.

It is added to the intensive mixer:

7.50 kg of cocoa powder (passing through a 60-mesh sieve), 2.50 kg of cassava flour acigal, 1.00 kg of carboxymethylcellulose, 1.55 kg of guar gum and the mixture is performed for 3 further minutes.

To facilitate the dispersion, with the intensive mixer in operation, a solution of 1.50 kg of propylene glycol and 0.225 kg of vanillin are added, and the process is maintained for 2 further min, when then 10.0 kg of water is added, and agitation is maintained for a further 3 minutes.

The material is kneaded twice and returns to the intensive mixer for 3 further minutes.

Finally, the material is submitted to the final lamination with on-line monitoring for obtaining a strip with thickness of 0.11 mm and moisture after drying of 11%, but not limited to these standards.

Example 4

Initially, the processing of 3.00 kg of short fiber pulp in an intensive mixer, for example the type GEIGER GUM-240E, is carried out during 4 min.

It is added to the intensive mixer:

13.50 kg of tobacco residue of Burley type (ground and passante in 40 mesh sieve), 1.10 kg of carboxymethylcellulose, and the mixture is performed for 3 further minutes.

To facilitate the dispersion, with the intensive mixer in operation, a solution of 1.35 kg of propylene glycol is added, and the process is maintained for 3 further minutes, when then 10.0 kg of water is added, and the agitation is maintained for 4 further minutes.

The material is kneaded twice and returns to the intensive mixer for 3 further minutes.

Finally, the material is submitted to the final lamination with on-line monitoring for obtaining a strip with thickness of 0.12 mm and moisture after drying of 12%, but not limited to these standards.

The invention claimed is:

1. A method for producing reconstituted vegetable strips characterized by the steps of:
    (a) milling vegetable materials to reach specific particle sizes between 10 and 200 MESH;
    (b) mixing cellulose fibers in an intensive mixer for 1 to 10 min producing nanocellulose fibers;
    (c) mixing the vegetable material obtained from step (a) with an agglutinating compound added to the nanocellulose fibers obtained from step (b);
    (d) adding at least one humectant agent and water to a mixture produced in step (c);
    (e) submitting the mixture described in step (d) to a step of shearing through a prelamination system comprised by at least two linear and parallel rollers;
    (f) submitting the strip obtained from step (e) to a mixture in the intensive mixer to obtain a homogeneous mass;
    (g) laminating the mixture obtained from step (f) between at least two linear and parallel lamination rollers, obtaining a continuous strip of specific thickness;
    (h) drying the vegetable strip obtained from step (g) through its passage through a thermal chamber in a specific temperature, between 90° C. and 900° C., through a conveyor belt; and
    (i) cutting and final processing of the dried strip obtained from step (h) for obtaining a final product.

2. The method of claim 1, characterized by the step of milling the vegetable material being performed on at least one, or a combination of more than one, vegetable material comprising any one or more of tobacco leaves, residues, and tobacco strips.

3. The method of claim 1, characterized by the step of milling the vegetable material being performed on at least one, or a combination of more than one, vegetable material comprising yerba mate, sage, chamomile, cocoa, acai, lemon grass, guarana, orange, banana, coffee, cinnamon and clove.

4. The method of claim 1, characterized by the step of milling the vegetable material being performed in a milling equipment.

5. The method of claim 1, wherein the cellulose fibers of step 1(b) corresponds to between 1 to 50% of the total dry mass of the mixture.

6. The method of claim 1, wherein the cellulose fibers of step 1(b) comprise any one or more of short fiber cellulose, long fiber cellulose, and/or cellulose nanofibers.

7. The method of claim 1, the agglutinating compound added in step 1(c) corresponds to between 1 to 30% of a total dry mass of the mixture, and a mass of the vegetable material corresponds to between 30 to 80% of the total dry mass of the mixture.

8. The method of claim 1, wherein the agglutinating compound of step 1(c) comprises using a binder, the binder comprising any one or more of corn starch, wheat starch, potato starch, oat starch, rice starch, non-starch hyrdrocolloids, acacia gum, arabic gum, xantham gum, guar gum, tara gum, locust beans (LBG), pectins, gelatins, agar-agar, alginates, carrageenan, carboxymethyl cellulose (CMC), hydroxypropyl cellulose (HPC), and/or microcrystalline cellulose (MCC).

9. The method of claim 1, wherein the humectant agent of step 1(d) comprises between 1 to 20% of the total dry mass of the mixture.

10. The method of claim 1, wherein the step of adding water at step 1(d) comprises adding an amount of water corresponding to between 30 to 60% of the mass of the mixture.

11. The method of claim 1, wherein the humectant agent comprises any one or more of glycerine and/or propylene glycol.

12. The method of claim 1, wherein the step of shearing through a lamination system is performed multiple times to guarantee a certain mechanical resistance of the final product.

13. The method of claim 1, wherein the step of cutting and final processing of the dried strip, comprises using different cutting systems in order to obtain different products with different cutting characteristics, comprising any one or more of coils with different lengths and diameters, strip cuts, rectangular-shaped cuts, and/or square-shaped cuts.

* * * * *